(12) United States Patent
Shimizu et al.

(10) Patent No.: US 12,337,784 B2
(45) Date of Patent: Jun. 24, 2025

(54) AIRBAG DEVICE AND VEHICLE SEAT

(71) Applicant: Autoliv Development AB, Vargarda (SE)

(72) Inventors: Takayuki Shimizu, Kanagawa (JP); Atsushi Nakashima, Kanagawa (JP)

(*) Notice: Subject to any disclaimer, the term of this patent is extended or adjusted under 35 U.S.C. 154(b) by 0 days.

(21) Appl. No.: 17/753,932

(22) PCT Filed: Aug. 5, 2020

(86) PCT No.: PCT/JP2020/030094
§ 371 (c)(1),
(2) Date: Mar. 18, 2022

(87) PCT Pub. No.: WO2021/059766
PCT Pub. Date: Apr. 1, 2021

(65) Prior Publication Data
US 2022/0379833 A1    Dec. 1, 2022

(30) Foreign Application Priority Data

Sep. 23, 2019 (JP) .................................. 2019-172381

(51) Int. Cl.
*B60R 21/207* (2006.01)
*B60N 2/427* (2006.01)
(Continued)

(52) U.S. Cl.
CPC ........ *B60R 21/207* (2013.01); *B60N 2/42718* (2013.01); *B60N 2/42763* (2013.01);
(Continued)

(58) Field of Classification Search
CPC .............. B60R 21/207; B60R 21/2338; B60R 2021/23386; B60R 2021/23146; B60N 2/42763; B60N 2/42718
See application file for complete search history.

(56) References Cited

U.S. PATENT DOCUMENTS 6,715,788 B2* 4/2004 Saiguchi .............. B60N 2/4279
280/733
9,573,553 B2* 2/2017 Ko .......................... B60R 21/13
(Continued)

FOREIGN PATENT DOCUMENTS

JP        2012-81958 A    4/2012
WO     2018/114723 A1    6/2018
(Continued)

OTHER PUBLICATIONS

WO-2020080747-A1 (including machine translation) (Year: 2020).*
(Continued)

*Primary Examiner* — Jason D Shanske
*Assistant Examiner* — Joselynn Y Sliteris
(74) *Attorney, Agent, or Firm* — Stephen T. Olson

(57) ABSTRACT

The present invention is an airbag device installed in a vehicle seat having a seat cushion forming the seat surface and a seatback forming the backrest, a pair of inflators stowed in the left and right side portions of said seatback and generating expansion gas, and an airbag stowed in said seatback in a rolled or folded state and deployed by the expansion gas released from said inflators. The airbag is configured to include a pair of left and right side chambers that deploy from the side of the seatback toward the front and restrain movement of at least the waist to the shoulders of an occupant, and a connection part that connects the pair of side chambers and is positioned above the head of the occupant when the airbag is deployed.

12 Claims, 9 Drawing Sheets

(51) Int. Cl.
 *B60R 21/231* (2011.01)
 *B60R 21/2338* (2011.01)
(52) U.S. Cl.
 CPC .................... *B60R 21/2338* (2013.01); *B60R 2021/23146* (2013.01); *B60R 2021/23386* (2013.01)

(56) References Cited

U.S. PATENT DOCUMENTS

| | | | |
|---|---|---|---|
| 10,189,432 B2* | 1/2019 | Matsushita | B60N 2/4235 |
| 10,632,958 B2* | 4/2020 | Dry | B60R 21/2338 |
| 10,821,929 B2* | 11/2020 | Kondrad | B60R 21/23138 |
| 10,974,626 B2* | 4/2021 | Yilma | B60N 2/42718 |
| 11,084,447 B2* | 8/2021 | Rupp | B60R 21/231 |
| 11,285,902 B2* | 3/2022 | Choi | B60R 21/207 |
| 11,351,950 B2* | 6/2022 | Sandinge | B60R 21/2338 |
| 11,498,512 B2* | 11/2022 | Huf | B60R 21/231 |
| 2006/0119083 A1 | 6/2006 | Peng | |
| 2006/0119149 A1* | 6/2006 | Yoshikawa | B60N 2/42718 280/753 |
| 2017/0259774 A1* | 9/2017 | Matsushita | B60R 21/2338 |
| 2019/0217805 A1* | 7/2019 | Dry | B60N 2/14 |
| 2021/0370863 A1* | 12/2021 | Gwon | B60R 21/233 |
| 2022/0289134 A1* | 9/2022 | Shimizu | B60R 21/233 |
| 2023/0012314 A1* | 1/2023 | Matsushita | B60R 21/207 |

FOREIGN PATENT DOCUMENTS

| WO | WO-2019170596 A1 * | 9/2019 | ........... B60R 21/207 |
|---|---|---|---|
| WO | WO-2020080747 A1 * | 4/2020 | ........... B60R 21/207 |

OTHER PUBLICATIONS

Office Action received in corresponding Chinese Patent Application 202080059720.9, dated Apr. 14, 2023 with translation.

* cited by examiner

AIRBAG DEVICE AND VEHICLE SEAT

TECHNICAL FIELD

The present invention relates to a vehicle seat and an airbag device installed in said seat. In particular, the present invention relates to an airbag device that can reliably restrain the occupant in question regardless of the posture of the occupant seated in the seat.

BACKGROUND TECHNOLOGY

The provision of a vehicle with one or more airbags in order to protect the occupants thereof in the event of a vehicle accident is well known. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the occupant upon impact in the transverse direction of a vehicle.

In recent years, with the advancement of automatic vehicle driving technology, occupants are anticipated to adopt various seating postures, such as a relaxed posture with the seat largely reclined, and such occupants need to be properly protected in such situations.

However, the well-known side airbag system installed in vehicle seats deploys airbags from one or both sides of the seat, making it difficult to adequately protect occupants in various postures.

SUMMARY OF THE INVENTION

Problem to be Solved by the Invention

The present invention has been created in view of the abovementioned problems; an object thereof is to provide an airbag device that may reliably restrain the occupant regardless of the posture of the occupant seated in the seat.

Means for Solving the Problems

The following describes means for solving the abovementioned problem and the effect thereof. In the present invention, when an occupant is seated in a seat in a regular posture, the direction the occupant faces is referred to as the "front," the opposite direction is referred to as the "rear," and the direction indicating the coordinate axis is referred to as the "front-to-back direction." Moreover, when the occupant is seated in the seat in a regular posture, the right of the occupant is referred to as "right direction," the left of the occupant is referred to as "left direction," and the direction indicating the coordinate axis is referred to as the "left-right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

In order to achieve the above purpose, the present invention is an airbag device installed in a vehicle seat having a seat cushion forming the seat surface and a seatback forming the backrest, a pair of inflators stowed in the left and right side portions of the seatback that generate expansion gas, and an airbag stowed in the seatback in a rolled or folded state and deployed by the expansion gas released from said inflators. The airbag is configured to include a pair of left and right side chambers that deploy from the side of the seatback toward the front and restrain movement of at least the waist to the shoulders of an occupant, and a connection part that connects the pair of side chambers and is positioned above the head of the occupant when the airbag is deployed.

By configuring the airbag to include a pair of left and right side chambers that restrain movement of the occupant from the waist to the shoulders, and a connection part that connects the pair of side chambers positioned above the occupant's head, the airbag deploys in a dome shape to cover the occupant seated in the seat. As a result, the airbag can reliably restrain movement of the occupant at least in the left-right direction, upward, and diagonally upward, and provide suitable protection from the head to the waist of the occupant.

The airbag connection part can comprise an expandable upper chamber that connects to the side chambers, and the upper chamber can be configured to deploy from near the upper edge of the seatback and deploy so as to encompass the occupant's head.

In this way, the expandable upper chamber deploys so as to encompass the occupant's head, thereby mitigating impact to the head.

The upper chamber can be configured to deploy from near the rear edge of the top of the seatback.

The upper chamber deploys from near the rear edge of the upper edge of the seatback, so that the upper chamber covers the back of the occupant's head from behind to in front of the occupant's head, thus avoiding direct impact on the occupant's head when the airbag deploys and creating a broad area of protection around the occupant's head.

The expansion gas released from the inflator can be configured to flow from the side chambers to the upper chamber.

By configuring the expansion gas to flow from the side chambers to the upper chamber, the side chambers can be deployed first to quickly restrain the lateral movement of the occupant, and then the upper chamber can be deployed to softly protect the head of the occupant. In other words, the head and neck of the occupant, which are vulnerable to impacts, will not be subjected to a large impact from the initial stage of airbag deployment.

The airbag can be equipped with a plurality of first connecting members for securing said airbag to the seatback when stowed.

By securing the airbag to the seatback with a plurality of first connecting members, the possibility of a gap between the seatback and the airbag during deployment of the airbag can be reduced. As a result, for example, when an occupant comes into contact with the airbag during a vehicle collision, the occupant will not protrude through the gap between the airbag and the seatback, and the occupant can be securely restrained.

The first connecting members can be provided with at least one each above and below the inflator on the left and right side portions of the seatback.

Installing first connecting members at least one each, above and below the inflator enables securing the area around the inflator where the greatest pressure is generated in the initial stage of airbag deployment, thereby stabilizing the deployment behavior of the airbag.

The first connecting members can be installed in the head region, chest to abdomen region, and waist region of the occupant on the left and right side portions of the seatback.

By installing the first connecting members in the head region, chest to abdomen region, and waist region of the occupant, the entire range from the waist up of the occupant seated in the seat can be restrained and protected.

Second connecting members in the form of a strip with a first end portion connected near the lower end area of the airbag in the stowed state and a second end portion connected to the side of the seat cushion can be further provided on both the left and right sides of the seat.

By providing second connecting members in the shape of a strip that connects the lower end area of the airbag to the side of the seat cushion, the restraint performance near the waist area of the occupant seated in the seat can be improved. In other words, when the waist, which is close to the occupant center of gravity, moves in a direction that pushes the airbag outward, the second connecting members can securely retain the airbag and avoid a situation where the occupant is flung out laterally.

The second connecting members in the form of a strip with a first end portion connected near the lower end area of the airbag in the stowed state and a second end portion connected to the side of the seat cushion can be further provided on both the left and right sides of the seat, and the first end portion can be formed wider than the second end portion.

Regarding the second connecting members, by shaping the first end portion connected to the airbag wider than the second end portion connected to the seat cushion, the deployment behavior at the lower end of the airbag will be stabilized.

The first end portion of the second connecting members can be connected near the front end portion of the side chamber in the deployed state.

By connecting the second connecting members near the front end portion of the side chamber, the deployment posture of the side chamber can be maintained in an appropriate state. If the second connecting members are connected near the rear end portion of the side chamber, it is assumed that the forward portion of the side chamber will be out of control when the airbag deploys, and the behavior will not be stable. In this regard, if the second connecting members are connected near the front end portion of the side chamber, the posture of the forward portion of the deployed side chamber can be reliably maintained, and the occupant restraint performance can be improved.

The seat cushion can be further provided with a lower connection part that extends generally along the vehicle width direction in the interior or bottom of the seat cushion and connects the second end portions of the left and right pairs of second connecting members. By providing a lower connection part extending in the vehicle width direction under the seat cushion, the second end portions of the second connecting members can be secured more reliably.

The pair of second connecting members and the lower connection part can be formed as a single tether. In addition, when the second connecting members and the lower connection part is made into a single tether, in addition to simplifying the structure (reducing the number of parts), the overall strength can be increased by omitting the connection part.

The lower connection part can be configured to extend in the vehicle width direction forward of the center of the seat cushion in the front-to-back direction.

By placing the lower connection part forward of the center in the front-to-back direction of the seat cushion, the second end portions of the second connecting members are placed in a position more forward than the first end portions thereof, thereby imparting suitable tension to the second connecting members.

Here, the lower connection part is preferably configured to push the seat cushion upward based on tension generated in the second connecting members when the airbag is deployed.

When the seat cushion is pushed upward by the lower connection part due to tension in the second connecting members, the part forward of the center of the seat cushion lifts the thigh of the occupant, which can properly restrain forward movement of the occupant and reduce the possibility of the so-called "seatbelt submarining." Such an effect is particularly noticeable in situations where the seat is reclined relatively heavily.

BRIEF DESCRIPTION OF THE DRAWINGS

FIG. 1 is a side view (A) and front view (B) illustrating an airbag device according to embodiment 1 of the present invention mounted in a vehicle seat, where the vehicle seat is illustrated as see-through.

FIG. 2(A) is a plan view illustrating the state in which the airbag is unfolded (state prior to being stowed). FIG. 2(B) is a front view illustrating the state in which the airbag is rolled (state when stowed).

FIG. 3(A) illustrates a view of the side in the vehicle width direction, and FIG. 3(B) illustrates a view from the front.

FIG. 4 (A) to (D) are side views illustrating a modified example of the airbag device according to embodiment 1 of the present invention, where the vehicle seat is illustrated as see-through.

FIG. 6 is a side view illustrating an airbag device according to embodiment 2 of the present invention mounted in a vehicle seat, where the vehicle seat is illustrated as see-through.

FIG. 7(A) illustrates a view from the front in the vehicle traveling direction, and FIG. 7(B) illustrates a view from the side in the vehicle width direction.

FIG. 8(A) illustrates a state in which the seat is not reclined or slightly reclined. FIG. 8(B) illustrates a state in which the seat is greatly reclined.

MODE FOR CARRYING OUT THE INVENTION

A vehicle seat according to an embodiment of the present invention will be described with reference to accompanying drawings. While this was stated above, "front" in each figure refers to the front of the vehicle (in the direction of travel), "rear" refers to the rear of the vehicle (opposite the direction of travel), "inside" refers to the inside of the vehicle width direction (occupant side), and "outside" refers to the outside of the vehicle width direction (door panel side).

Embodiment 1

Figure 1:
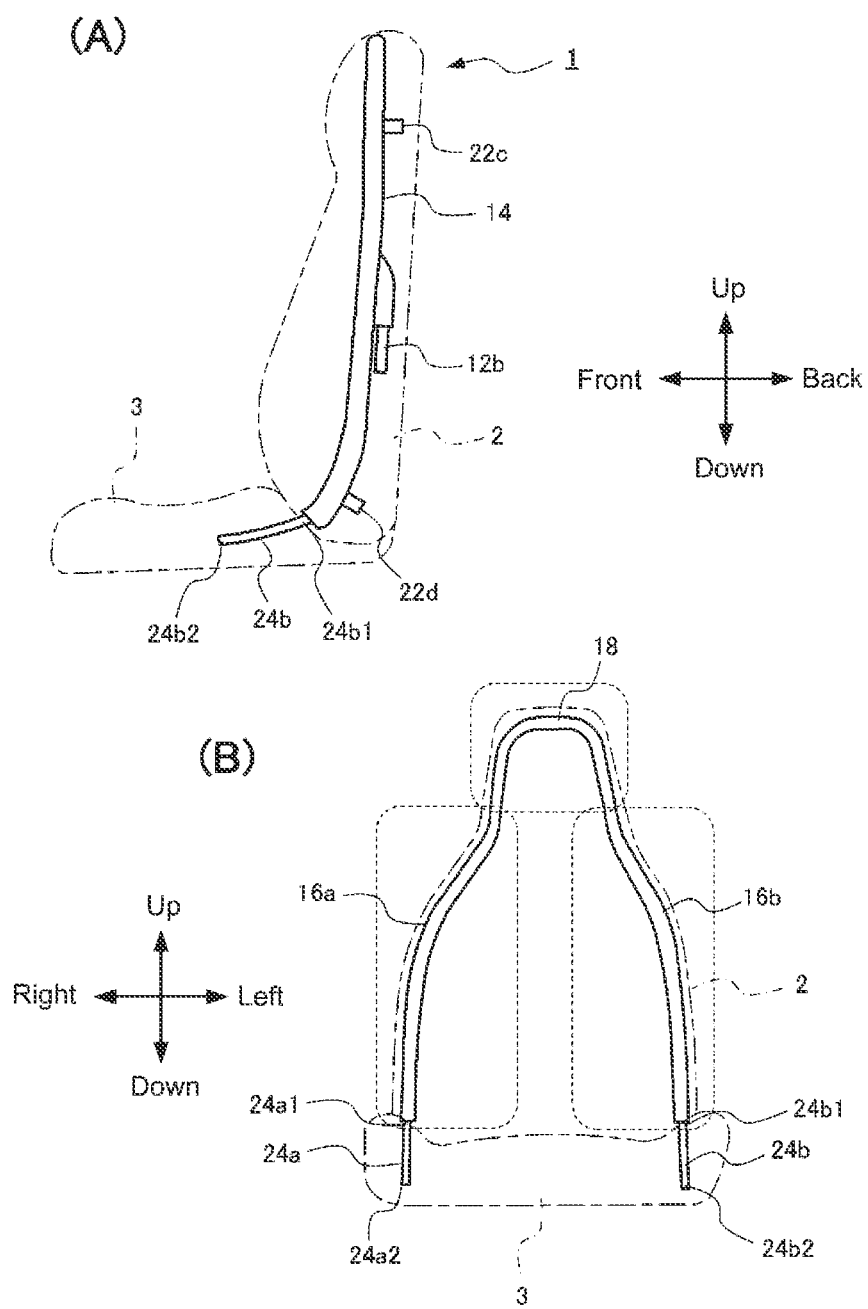
Figure 2:
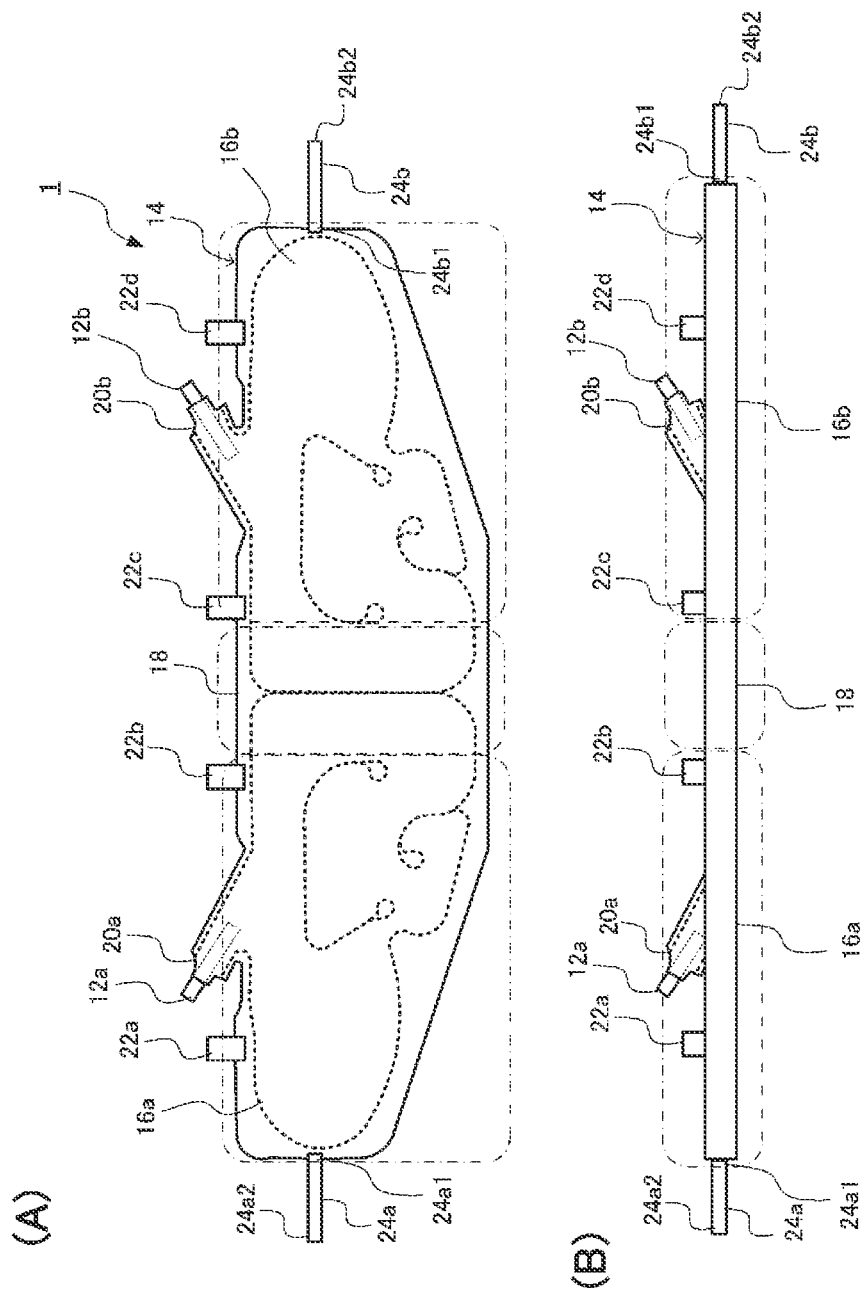
FIG. 2 illustrates the structure of an airbag used in the airbag device according to embodiment 1 of the present invention.

FIG. 1 is a side view (A) and front view (B) illustrating an airbag device 1 according to embodiment 1 of the present invention mounted in a vehicle seat (2, 3), where the vehicle seat (2, 3) is illustrated as see-through. FIG. 2 illustrates the structure of an airbag 14 used in the airbag device 1 according to embodiment 1. FIG. 2(A) is a plan view illustrating the state in which the airbag 14 is unfolded (state prior to being stowed). FIG. 2(B) is a front view illustrating the state in which the airbag is rolled (state when stowed).

The airbag device 1 according to the present example is equipped in a vehicle seat having a seat cushion 3 forming a seating surface and a seatback 2 forming a backrest. The airbag device 1 includes a pair of inflators 12a and 12b, which are stowed in the left and right side portions of the seatback 2 and generate expansion gas, and an airbag 14 stowed in the seatback 2 in a rolled or folded state that is deployed by the expansion gas discharged from the inflators 12a and 12b. In the present embodiment, the seatback 2 includes an integrated headrest, but this airbag device can also be applied to seats equipped with a headrest as a separate member.

The airbag 14 is configured to include a pair of left and right side chambers 16a and 16b that deploy from the side of the seatback 2 toward the front and restrain movement of at least the waist to the shoulders of the occupant, and a connection part 18 that connects the pair of side chambers 16a and 16b and is positioned above the head of the occupant when the airbag 14 is deployed. The side chambers 16a and 16b can be symmetrical in shape. The connection part 18 is positioned in the longitudinal center of the airbag 14 when in an unfolded state before stowing (FIG. 2) and is integrally formed using the same fabric as the side chambers 16a and 16b.

Figure 3:
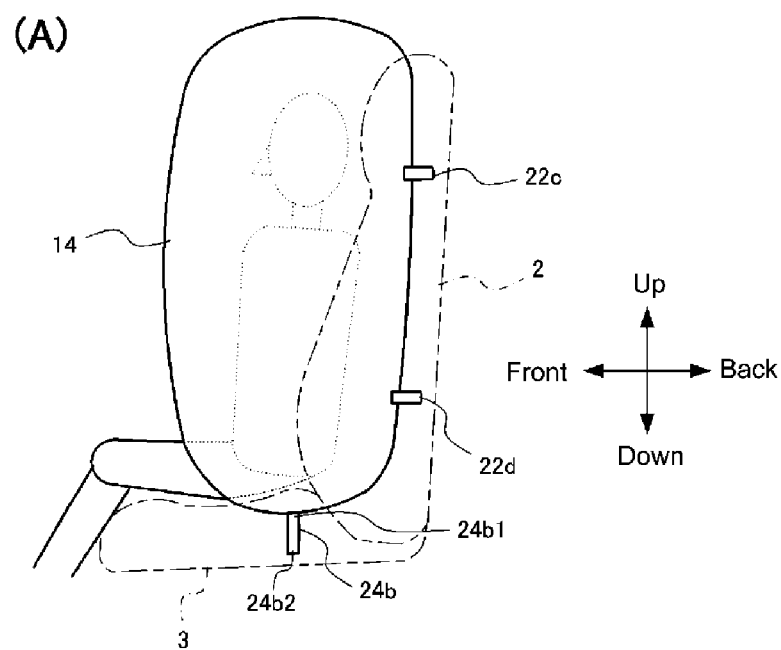
FIG. 3 illustrates the activated state (airbag deployed state) of the airbag device according to embodiment 1 of the present invention.
Figure 3:
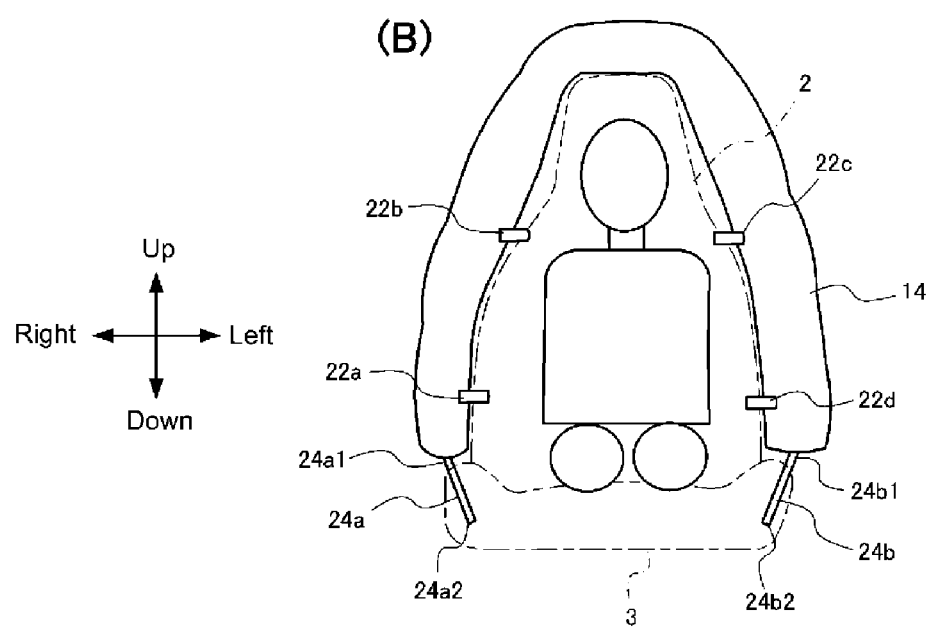

The connection part 18 of the airbag 14 includes an expandable upper chamber that connects to the side chambers 16a and 16b, and the upper chamber is configured to expand from near the upper edge of the seatback 2 to encompass the head of the occupant (FIG. 3). The expanded gas discharged from the inflators 12a and 12b flows from the side chambers 12a, 12b into the upper chamber (18). In addition to being configured as an expandable chamber, the connecting member 18 can also be configured as a non-expandable region. In this case, the thickness in the vertical direction becomes thinner.

The airbag device 1 according to the present embodiment is provided with first connecting members (tabs) 22a, 22b, 22c, and 22d for securing the rolled and compressed airbag 14 to the seatback 2. The first connecting members 22a, 22b, 22c, 22d are arranged one above and one below the inflators 12a and 12b on the left and right side portions of the seatback 2. The inflators 12a and 12b are introduced through the inflator introduction portions 20a and 20b of the airbag 14.

Installing the first connecting members 22a, 22b, 22c, 22d above and below the inflators 12a and 12b enables securing the area around the inflator where the greatest pressure is generated in the initial stage of deploying the airbag 14, thereby stabilizing the deployment behavior of the airbag 14.

Note, the first connecting members can be installed in the head region, chest to abdomen region, and waist region of the occupant in the left and right side portions of the seatback 2. In this case, it is possible to restrain and protect the entire range of occupants seated in the seat.

The airbag device 1 according to the present embodiment is further provided with second connecting members 24a and 24b in the shape of a strip with first end portions (24a1, 24b1) connected to the lower end area of the airbag 14 and second end portions (24a2, 24b2) connected to the side part of the seat cushion 3, on both the left and right sides of the seat. The second connecting members 24a and 24b can be made of the same material (cloth) as the airbag 14. Here, the first end portions (24a1, 24b1) of the second connecting members 24a and 24b are connected near the front end portion of the side chambers 16a and 16b in the deployed state thereof.

FIG. 3 illustrates the activated state (airbag 14 deployed state) of the airbag device 1 according to embodiment 1. FIG. 3(A) illustrates a view of the side of the vehicle in the width direction, and FIG. 3(B) illustrates a view from the front.

When a side collision or other event occurs, the inflators 12a and 12b release the expanding gas, causing the airbag 14 to expand and deploy. When the airbag 14 begins to expand, the gas first flows into the side chambers 16a and 16b, and then into the upper chambers that make up the connection part 18. Then, the side chambers 16a and 16b expand from the side of the seatback 2 toward the front. The chamber of the connection part 18, is positioned above the head of the occupant, then expands forward.

By configuring the airbag 14 according to the present embodiment to include a pair of left and right side chambers 16a and 16b that restrain movement of the occupant from the waist to the shoulders, and a connection part 18 that connects the pair of side chambers 16a and 16b and is located above the head of the occupant, the airbag 14 deploys in a dome shape to cover the occupant seated in the seat 3. As a result, the airbag can reliably restrain movement of the occupant at least in the left-right direction, upward, and diagonally upward, and provide suitable protection from the head to the waist of the occupant.

In addition, since the connection part 18 is formed as an expandable upper chamber, the connection part 18 expands to encompass the head of the occupant (FIG. 3(B)), which makes it possible to properly absorb impacts on the head.

In addition, by configuring the expansion gas to flow from the side chambers 16a and 16b to the upper chamber 18, the side chambers 16a and 16b can be expanded first to quickly restrain the lateral movement of the occupant, and then the upper chamber 18 can be expanded to softly protect the head of the occupant. This means that the head and neck, which are vulnerable to impact, can be restrained (protected) relatively softly without applying a large impact in the initial stage of airbag 14 deployment.

The upper chamber, which constitutes the connection part 18, deploys from near the rear edge of the upper end of the seatback 2. The upper chamber 18 expands from near the rear edge of the upper end of the seatback 2, so that the upper chamber 18 covers the back of the head of the occupant from behind to in front. This avoids the upper chamber 18 directly impacting the head of the occupant when the airbag 14 deploys, and also makes it possible to create a wide area of protection around the head of the occupant. If the seatback and headrest are constructed as separate components, the connecting member 18 is designed to launch over the headrest from the top of the seatback and expand forward.

In addition, by securing the airbag 14 to the seatback 2 with a plurality of first connecting members 22a, 22b, 22c, 22d, the possibility of a gap between the seatback 2 and the airbag 14 during deployment of said airbag 14 can be reduced. As a result, for example, when an occupant comes into contact with the airbag 14 during a vehicle collision, the occupant will not protrude through the gap between the airbag 14 and the seatback 2, and the occupant can be securely restrained.

By providing second connecting members 24a and 24b in the shape of a strip that connects the lower end area of the airbag 14 to the side part of the seat cushion 3, the restraint performance near the waist area of the occupant seated in the seat (2, 3) can be improved. In other words, when the waist, which is close to the occupant center of gravity, moves in a direction that pushes the airbag 14 down outward, the second connecting members 24a and 24b can securely hold the airbag 14 and avoid a situation where the occupant is flung out laterally.

In addition, by connecting the first end portions (24a1, 24b1) of the second connecting members 24a and 24b near the front end portion of the side chambers 16a and 16b, the deployment posture of the side chambers 16a and 16b can be maintained in a suitable state. Assuming that the first end portions (24a1, 24b1) of the second connecting members 24a and 24b are connected near the rear end portion of the side chambers 16a and 16b, the forward portion of the side chambers 16a and 16b will be out of control when the airbag 14 deploys, and the behavior will not be stable. In this regard, by connecting the first end portions (24a1, 24b1) of the second connecting members 24a and 24b near the front end portion of the side chambers 16a and 16b, the deployment posture of the forward portion of the side chambers 16a and 16b can be suitably maintained (controlled), improving occupant restraining performance.

Figure 4:
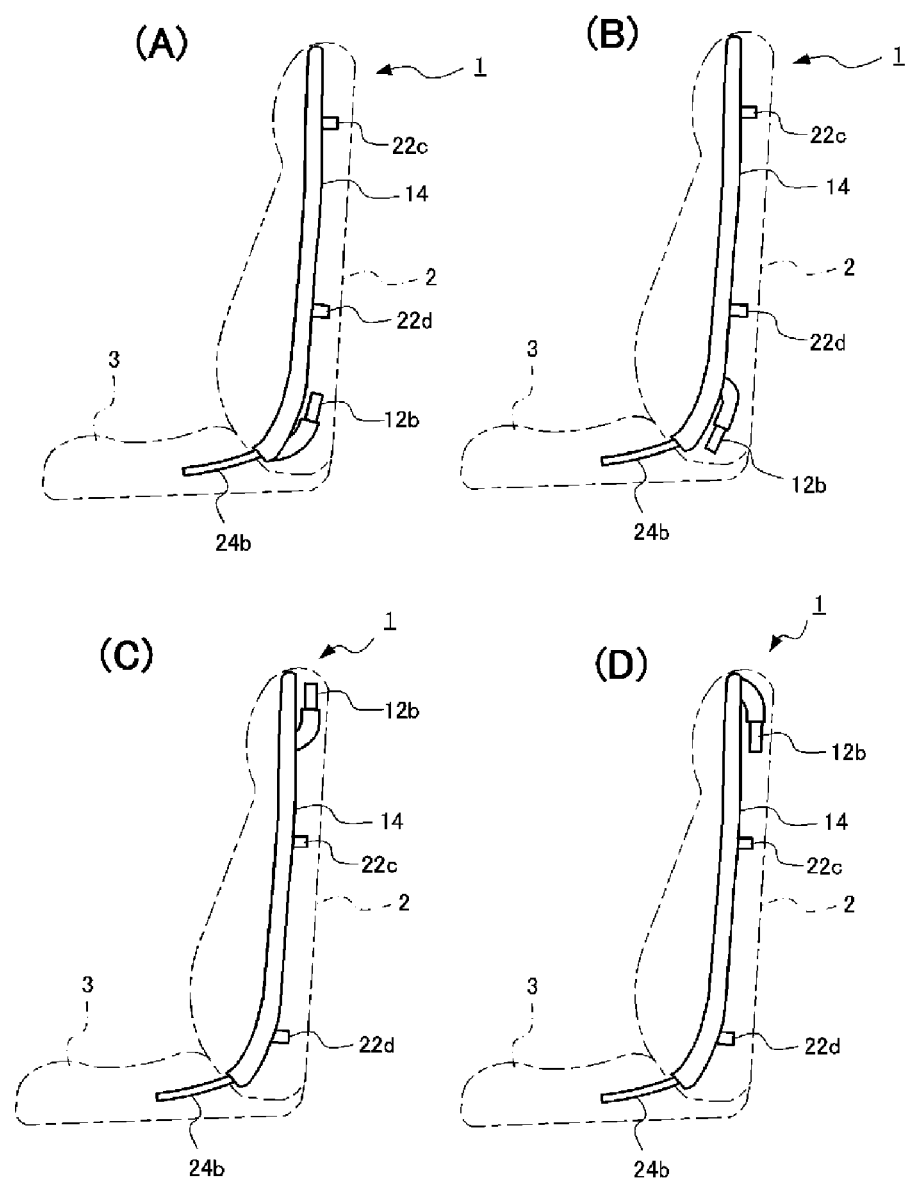

FIG. 4 (A) to (D) are side views illustrating a modified example of the airbag device 1 according to embodiment 1, where the vehicle seat is illustrated as see-through. These four variations all differ in the arrangement of the inflators (12a, 12b). In the examples of diagrams (A) and (B), the inflators 12a and 12b are arranged on the lower end part of the seatback 2, and due to this, the first connecting members 22c and 22d (22a, 22b) are arranged near the head and waist of the occupant. The only difference between (A) and (B) is the direction in which the inflators 12a and 12b are inserted. In other words, in the example of the diagram (A), inflators 12a and 12b are inserted from above, and in the example of the diagram (B), inflators 12a and 12b are inserted from below.

In the examples of diagrams (C) and (D), the inflators 12a and 12b are arranged on the upper end part of the seatback 2, and due to this, the first connecting members 22c and 22d (22a, 22b) are arranged near the shoulder and waist of the occupant. The only difference between (A) and (B) is the direction in which the inflators 12a and 12b are inserted. In other words, in the example of the diagram (A), inflators 12a and 12b are inserted from above, and in the example of the diagram (B), inflators 12a and 12b are inserted from below.

As another variation, a single inflator can be arranged at the back of the seatback 2 and configured to guide the expansion gas from there to both sides of the seatback 2.

Variation of Embodiment 1

FIG. 5(A) is a plan view illustrating the structure of the airbag according to the modified example of embodiment 1, and FIG. 5(B) to (D) are plan views illustrating variations of the second connecting members. FIG. 5(A) is a drawing corresponding to FIG. 2(A), and only the shape of the second connecting members (124a, 124b) are different, so only those parts will be described.

As illustrated in FIG. 5(A), the first end portions (124a1, 124b1) of the second connecting members (124a, 124b) are formed wider than the second end portions (124a2, 124b2) thereof. In this example, the second connecting members (124a, 124b) are generally formed in a trapezoidal shape, however, as illustrated in FIG. 5(B) to (D), there are other variations such as a member 224 with the middle portion curved inward, a member 324 with a shape in which the width of the end portion is constant within a given range, and a member 424 which is formed in a triangular shape.

Figure 5:
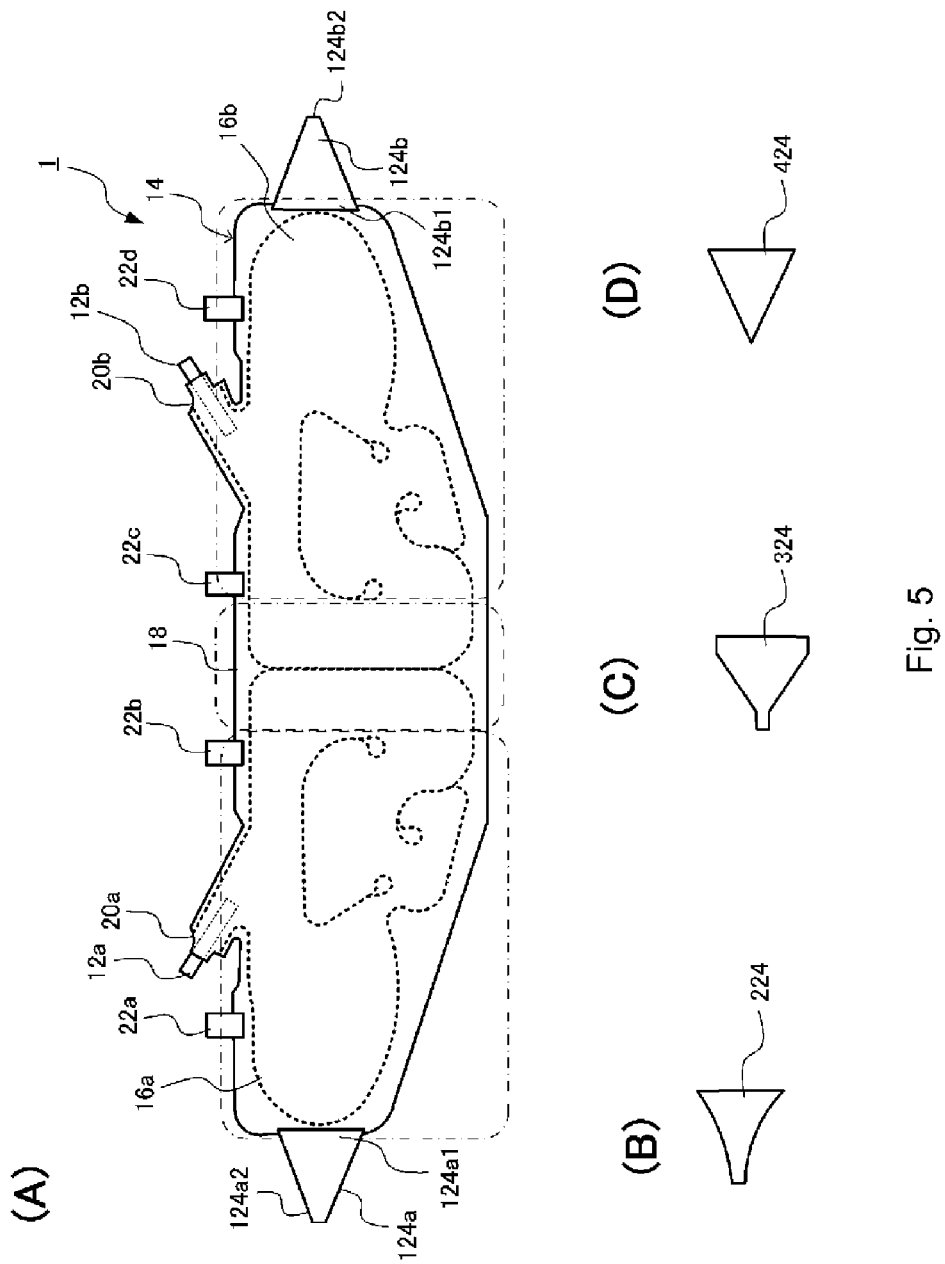
FIG. 5(A) is a plan view illustrating the structure of the airbag according to the modified example of embodiment 1.
FIG. 5(B) to (D) are plan views illustrating variations of the second connecting members.

Regarding the second connecting members (124a, 124b) of variations illustrated in FIG. 5, forming the first end portions 124a1 and 124b1 connected to the airbag wider than the second end portions 124a2 and 124b2 connected to the seat cushion stabilizes the deployment behavior at the lower end of the airbag. The second connecting members (124a, 124b) of the structure in FIG. 5 can also be applied to embodiment 2 described below.

Embodiment 2

Figure 6:
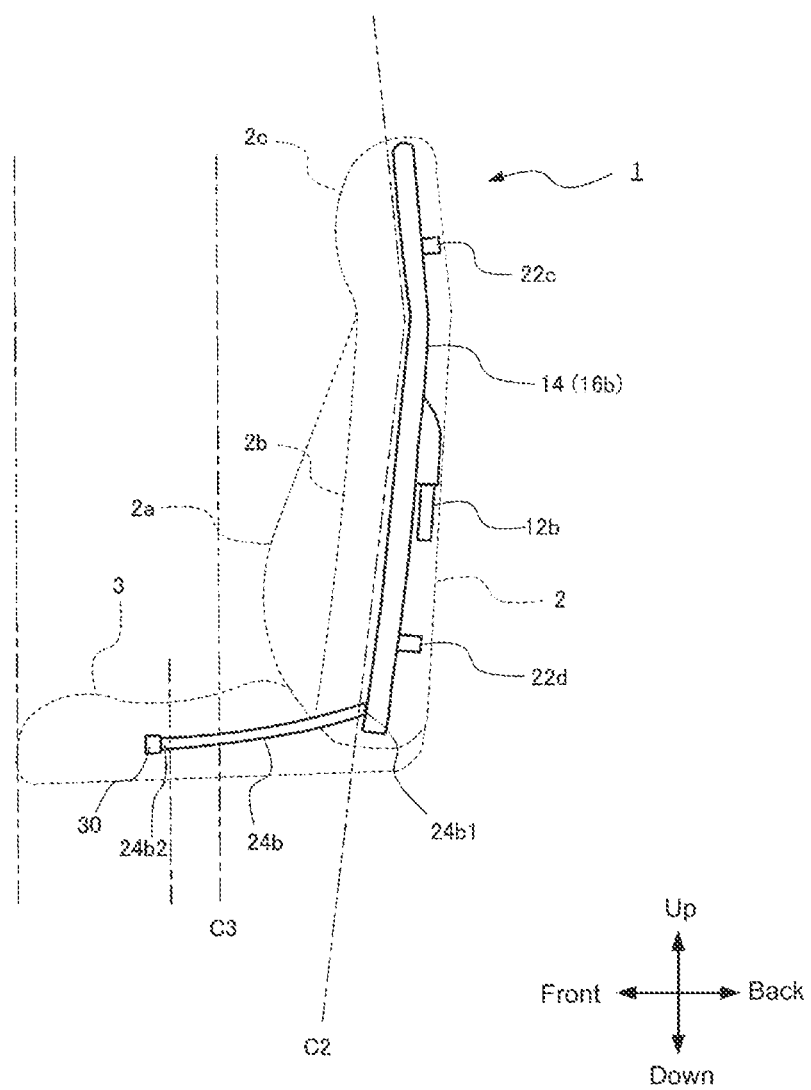
Figure 7:
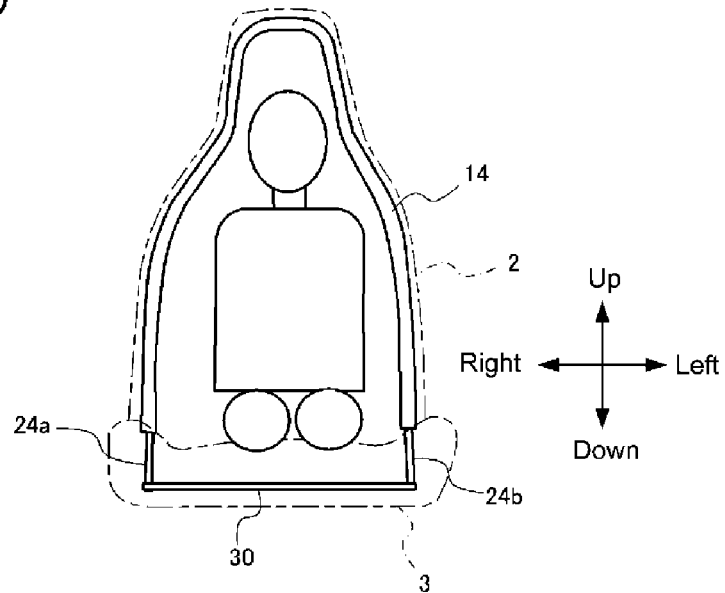
FIG. 7 illustrates the non-activated state (stowed state) of the airbag device according to embodiment 2 of the present invention.
Figure 7:
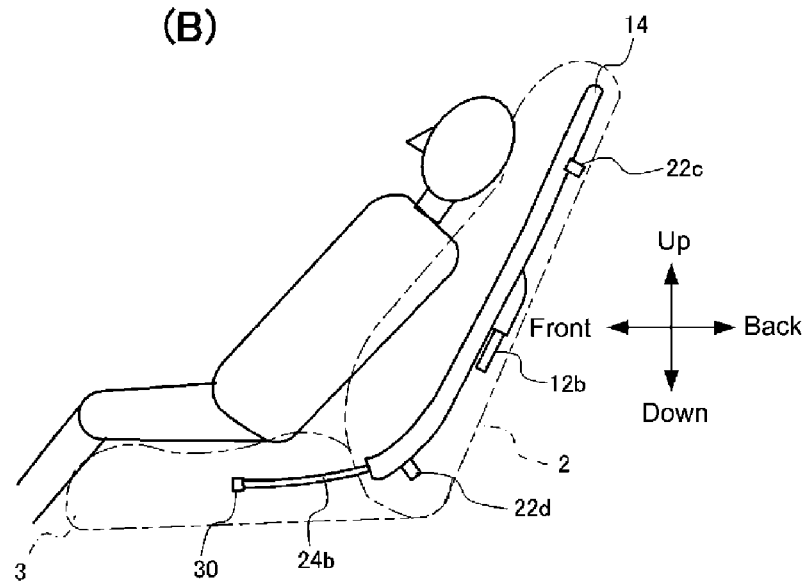
Figure 8:
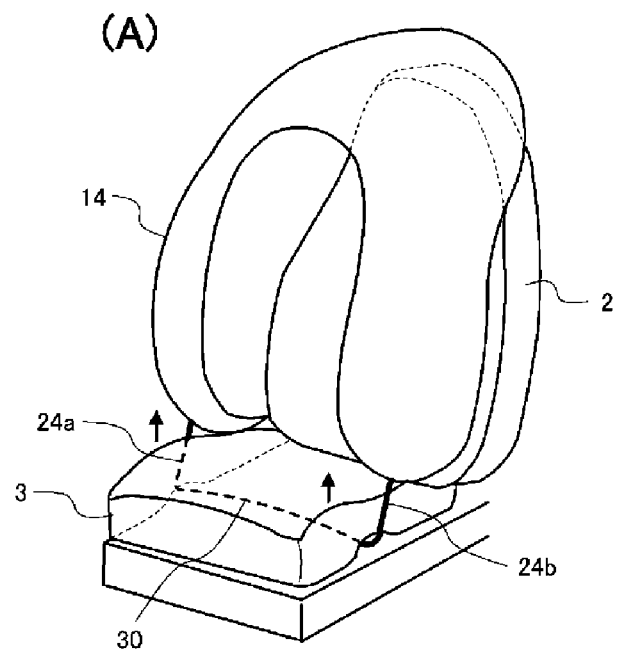
FIG. 8 is a schematic perspective view illustrating the activated state (airbag deployed state) of the airbag device according to embodiment 2 of the present invention.
Figure 8:
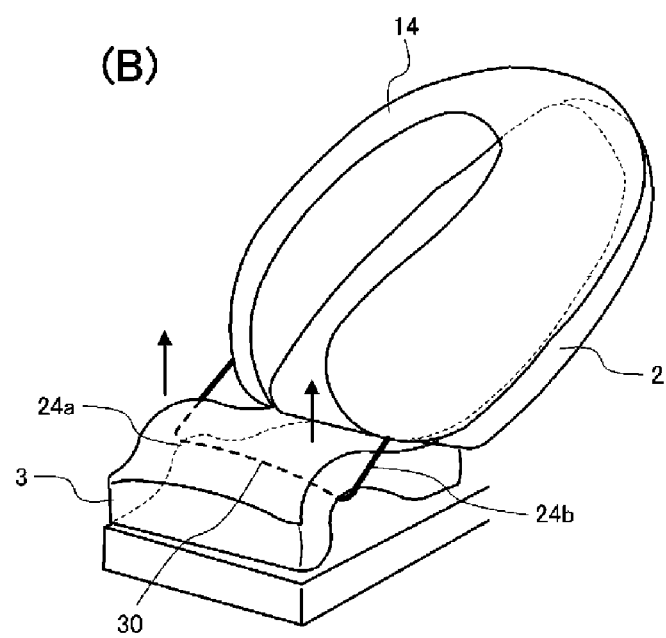
Figure 9:
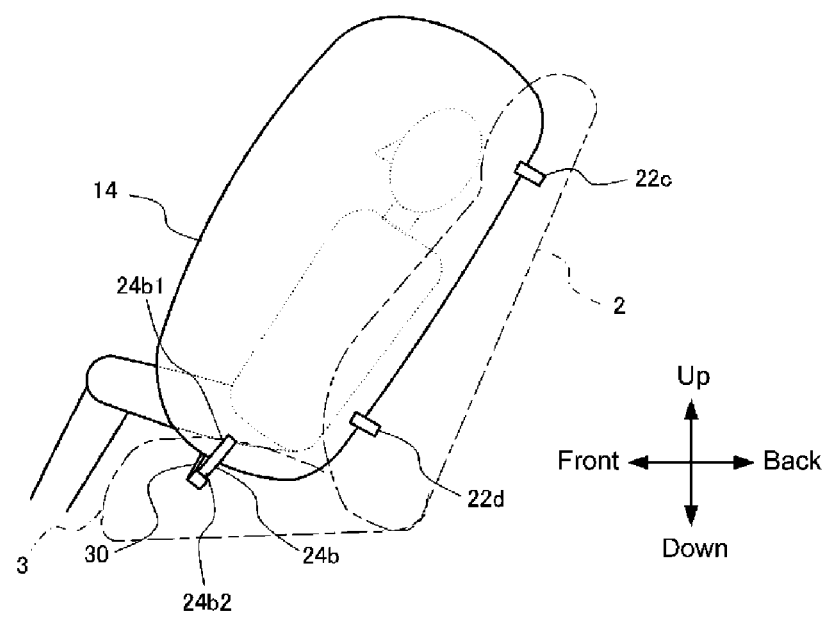
FIG. 9 is a schematic view illustrating the activated state (airbag deployed state) of the airbag device according to embodiment 2 of the present invention as viewed from the side in the vehicle width direction.

FIG. 6 is a side view illustrating an airbag device 1 according to embodiment 2 of the present invention mounted in a vehicle seat (2, 3), where the vehicle seat (2, 3) is illustrated as see-through. FIG. 7 illustrates the non-activated state (stowed state) of the airbag device 1 according to embodiment 2. FIG. 7(A) illustrates a view from the front in the vehicle traveling direction, and FIG. 7(B) illustrates a view from the side in the vehicle width direction. FIG. 8 is a schematic perspective view illustrating the activated state (airbag deployed state) of the airbag device 1 according to embodiment 2. FIG. 8(A) illustrates a state in which the seatback 2 is not reclined or slightly reclined. FIG. 8(B) illustrates a state in which the seatback 2 is greatly reclined. FIG. 9 is a schematic view illustrating the activated state (airbag deployed state) of the airbag device 1 according to embodiment 2 as viewed from the side in the vehicle width direction.

Regarding embodiment 2 described below, components identical or equivalent to those in embodiment 1 already described are given the same code and redundant explanations are omitted, but the same functions and effects are achieved.

The airbag device 1 according to the present embodiment is further provided with a lower connection part 30 that extends generally along the vehicle width direction inside or at the bottom of the seat cushion 3 and connects the second end portions 24a2 and 24b2 of the pair of left and right second connecting members 24a and 24b. The pair of second connecting members 24a and 24b and the lower connection part 30 can be formed as a single tether. In addition to a fabric tether, metal wires or other materials can be employed as the lower connection part 30. The lower connection part 30 can be placed inside the seat cushion 3 or through the space between the seat cushion 3 and the seat frame.

As illustrated in FIG. 6, the airbag 14 in a rolled and stowed state is positioned behind the longitudinal center line C2 of the seatback 2 and is secured along the center line C2. Here, with regard to the seatback 2, the code 2a indicates the side support and the code 2b indicates the receiving surface (the surface in contact with the back of the occupant). In addition, the center line C2 means a line that passes approximately through the middle of the receiving surface 2*b* and the back in the front-back direction of the seatback 2. The rolled airbag 14 can be placed above or in front of the center line C2 of the seatback 2.

The connection position of the second end portion 24*b*2 (24*a*2) of the second connecting member 24*b* (24*a*) and the lower connection part 30 is forward of the center line C3 in the front-to-back direction of the seat cushion 3. In other words, the lower connection part 30 is arranged to extend in the vehicle width direction in front of the center of the seat cushion 3 in the front-to-back direction (the waist center of the occupant). In addition, the length of the second connecting member 24*b* (24*a*) is preferably set as short as possible in a range that does not interfere with the reclining movement of the seatback 2 when the airbag device 1 is not activated.

The various conditions described above regarding the arrangement of the airbag device 1 can be applied to embodiment 1, except for the lower connection part 30.

Starting at the state before the airbag device 1 is activated as illustrated in FIG. 7, when the airbag device 1 is activated, the inflators 12*a* and 12*b* discharge expansion gas to expand and deploy the airbag 14 (FIG. 8, FIG. 9). When the airbag 14 begins to expand, the gas first flows into the side chambers 16*a* and 16*b*, and then into the upper chambers that make up the connection part 18. Then, the side chambers 16*a* and 16*b* expand from the side of the seatback 2 toward the front. The chamber of the connection part 18, is positioned above the head of the occupant, then expands forward. The operation up to this point is the same as in embodiment 1 described above.

When the airbag 14 is deployed, as illustrated in FIG. 8 and FIG. 9, tension is generated in the second connecting members 24*a* and 24*b*, and the lower connection part 30 connected to the second connecting members 24*a* and 24*b* pushes the seat cushion 3 upward. When the seat cushion 3 is pushed upward by the lower connection part 30 due to tension in the second connecting members 24*a* and 24*b*, the part forward of the center of the seat cushion 3 lifts the thigh of the occupant, which can properly restrain forward movement of the occupant and reduce the possibility of the so-called "seatbelt submarining." In FIG. 8, the seat cushion 3 is partially depicted as see-through to ease understanding of the position and shape of the lower connection part 30.

In the present embodiment, the lifting effect of the seat cushion 3 by the lower connection part 30 is more pronounced in a situation where the seat is greatly reclined (the seatback 2 is greatly tilted (see FIG. 8(B)) than when the seat is not reclined (the seatback 2 is nearly vertical). When the airbag 14 deploys while the seatback 2 is tilted backward, the lower end of the airbag 14 moves backward and at least the forward portion of the seat cushion 3 partially rises. This means that the lower end part of the airbag 14 will move away from the seat cushion 3. This will increase the tension applied to the second connecting members 24*a* and 24*b* and lower connection part 30 connected to the lower end part of the airbag 14, causing the seat cushion 3 to be lifted upward with a strong force. Depending on the material, shape, and installation position of the lower connection part 30, the seat cushion 3 may be deformed so that it is inclined backward as a whole.

In the present embodiment, by providing a lower connection part 30 extending in the vehicle width direction under the seat cushion 3, the second end portions (24*a*2, 24*b*2) of the second connecting members 24*a* and 24*b* can be secured more reliably. The lower connection part 30 can be composed of a flexible tether as described above, but instead of a tether, a plate made of rigid metal or resin can be employed. When the lower connection part 30 is composed of a rigid plate, the effect of lifting the thigh of the occupant is greater.

In addition, when the second connecting members 24*a* and 24*b* and the lower connection part 30 is made into a single tether, in addition to simplifying the structure (reducing the number of parts), the overall strength can be increased by omitting the connection part.

By placing the lower connection part 30 forward of the center C3 in the front-to-back direction of the seat cushion 3, the second end portions (24*a*2, 24*b*2) of the second connecting members 24*a* and 24*b* are placed in a position more forward than the first end portions (24*a*1, 24*b*1) thereof when the airbag 14 deploys, thereby imparting suitable tension to the second connecting members 24*a* and 24*b*.

The present invention has been described with reference to embodiments; however, the present invention is not limited to the embodiments described above. In other words, changes can be made as necessary without deviating from the scope of the technical concept of the invention.

The invention claimed is:

1. An airbag device in combination with a vehicle seat having a seat cushion forming a seat surface and a seatback forming a backrest, the airbag device comprising:
   first and second inflators stowed in left and right sides of the seatback, respectively, for generating expansion gas; and
   an airbag for stowage in the seatback in a rolled or folded state and deployable by the expansion gas generated by the first and second inflators, the airbag including:
   left and right side chambers for deployment from the left and right sides of the seatback, respectively, in a forward direction; and
   a connection part connecting the left and right side chambers, the connection part configured for positioning above a head of an occupant when the airbag is inflated and deployed;
   wherein the airbag device further includes a plurality of seatback connecting members connecting the airbag to the seatback of the vehicle seat and a plurality of seat cushion connecting members connecting the airbag to the seat cushion during stowage of the airbag and through inflation and deployment of the airbag, the plurality of seatback connecting members including at least a first and second seatback connecting members connecting the left and right side chambers of the airbag, respectively, to the seatback and the plurality of seat cushion connecting members including first and second seat cushion connecting members connecting the airbag to first and second laterally opposite sides of the seat cushion, respectively;
   wherein the first and second seat cushion connecting members are both in a shape of an elongated strip with a first proximal end portion directly connected to a lower end area of the left and right side chambers of the airbag in a stowed state and a second distal end portion provided on both left and right sides of the seat cushion;
   a rigid plate extending along a vehicle width direction inside or at a bottom of the seat cushion and having opposite ends connected directly to the second distal end portions of a respective one of the first and second seat cushion connecting members, wherein the rigid plate is forward of a center of the seat cushion in a front-back direction, wherein the rigid plate is configured to push the seat cushion upward due to a tension created in the seat cushion connecting members when the airbag is deployed.

2. The airbag device according to claim 1, wherein
the connection part of the airbag includes an expandable upper chamber connected to the left and right side chambers, and
the upper chamber is configured for deployment from near an upper edge of the seatback.

3. The airbag device according to claim 2, wherein the upper chamber is configured for deployment from near a rear edge of an upper end of the seatback.

4. The airbag device according to claim 2, wherein the airbag is configured such that expansion gas released from the first and second inflators flows from the left and right side chambers to the upper chamber.

5. The airbag device according to claim 1, wherein the first and second seatback connecting members are provided above the first and second inflators, respectively, and the plurality of seatback connecting members further includes third and fourth seatback connecting members connecting the left and right side chambers of the airbag, respectively, to the seatback below the first and second inflators, respectively.

6. The airbag device according to claim 5, wherein the left side chamber of the airbag includes a first inlet for the first inflator between the first and third seatback connecting members and the right side chamber of the airbag includes a second inlet for the second inflator between the second and fourth seatback connecting members.

7. The airbag device according to claim 6, wherein the airbag in an unfolded state prior to attachment to the vehicle seat is elongated in a first direction and both of the first and second seat cushion connecting members extend from the airbag in the first direction, and further wherein the first and second inlets for the first and second inflators, respectively, are askew to the first direction.

8. The airbag device according to claim 1, wherein the first proximal end portions of the first and second seat cushion connecting members are connected near a front end portion of the left and right side chambers in a deployed state.

9. The airbag device according to claim 1, wherein the airbag includes a length and a width such that when the airbag is stowed, the length extends from a lower portion of the right side of the seatback, upwardly around an outer perimeter of the backrest, and downwardly to a lower portion of the left side of the seatback, the width extending in a front to rear direction upon deployment of the airbag.

10. The airbag device according to claim 9, wherein the seat cushion connecting members are attached to the airbag and extend from the airbag in a direction of the length of the airbag.

11. The airbag device according to claim 1, wherein the airbag in an unfolded state prior to attachment to the vehicle seat is elongated in a first direction and both of the first and second seat cushion connecting members extend from the airbag in the first direction.

12. The airbag device according to claim 11, wherein first and second seatback connecting members extend in a direction perpendicular to the first direction.

* * * * *